United States Patent
Kliger et al.

(10) Patent No.: US 12,381,752 B2
(45) Date of Patent: Aug. 5, 2025

(54) NORTH PORT INTERFERENCE MITIGATION IN A FULL DUPLEX (FDX) AMPLIFIER

(71) Applicant: AVAGO TECHNOLOGIES INTERNATIONAL SALES PTE. LIMITED, Singapore (SG)

(72) Inventors: Avi Kliger, Ramat Gan (IL); Niki Pantelias, Berkeley Lake, GA (US); Hagay Garti, Tel Aviv (IL); Anatoli Shindler, Airport City (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/752,348

(22) Filed: May 24, 2022

(65) Prior Publication Data
US 2023/0254175 A1   Aug. 10, 2023

Related U.S. Application Data

(60) Provisional application No. 63/299,658, filed on Jan. 14, 2022.

(51) Int. Cl.
*H04L 12/28* (2006.01)
*H04L 1/08* (2006.01)
*H04L 5/14* (2006.01)

(52) U.S. Cl.
CPC ........... *H04L 12/2801* (2013.01); *H04L 1/08* (2013.01); *H04L 5/1461* (2013.01)

(58) Field of Classification Search
CPC ...... H04L 12/2801; H04L 1/08; H04L 5/1461
See application file for complete search history.

(56) References Cited

U.S. PATENT DOCUMENTS

| | | | |
|---|---|---|---|
| 11,375,527 B1 * | 6/2022 | Eyuboglu | H04B 7/15528 |
| 2010/0119079 A1 * | 5/2010 | Kim | G10L 21/0208 381/94.1 |
| 2013/0276047 A1 * | 10/2013 | Chapman | H04N 21/6547 725/111 |
| 2015/0029869 A1 * | 1/2015 | Wolcott | H04B 3/487 370/242 |
| 2016/0261433 A1 * | 9/2016 | Mishra | H04L 25/0228 |
| 2017/0111737 A1 * | 4/2017 | Painter | H04R 3/002 |
| 2019/0379338 A1 * | 12/2019 | Lee | H03F 3/245 |
| 2022/0069969 A1 * | 3/2022 | Young | H04L 5/003 |
| 2022/0159743 A1 * | 5/2022 | Su | H04W 74/006 |
| 2022/0272547 A1 * | 8/2022 | Noh | H04W 72/20 |
| 2023/0139509 A1 * | 5/2023 | Landman | G06F 8/65 717/168 |
| 2023/0198824 A1 * | 6/2023 | Chelehmal | H04L 27/266 375/262 |
| 2023/0261744 A1 * | 8/2023 | Tochino | H04B 10/0771 398/20 |

\* cited by examiner

*Primary Examiner* — Michael H Hong
(74) *Attorney, Agent, or Firm* — Foley & Lardner LLP

(57) ABSTRACT

In some aspects, the disclosure is directed to methods and systems for interference mitigation and cancellation in full duplex amplifiers for cable modem or broadband communication systems. In many implementations, an interference canceller in the downstream path may be provided to equalize composite power on the FDX upstream subbands within a predetermined range of amplitude (e.g. X dB) from the desired downstream signal on the same subband, without affecting the downstream subbands.

20 Claims, 12 Drawing Sheets
(2 of 12 Drawing Sheet(s) Filed in Color)

NORTH PORT INTERFERENCE MITIGATION IN A FULL DUPLEX (FDX) AMPLIFIER

RELATED APPLICATIONS

This application claims the benefit of and priority to U.S. Provisional Application No. 63/299,658, entitled "North Port Interference Mitigation in a Full Duplex (FDX) Amplifier," filed Jan. 14, 2022, the entirety of which is incorporated by reference herein.

FIELD OF THE DISCLOSURE

This disclosure generally relates to systems and methods for broadband network communications.

BACKGROUND OF THE DISCLOSURE

New implementations of broadband communications systems utilize full duplex (FDX) communications with simultaneous upstream and downstream transmissions within the same spectrum. FDX amplifiers may be used in such systems to provide service, such as for retransmissions or rebroadcasts of signals between devices. These amplifiers may be prone to interference from various noise sources, which may impair operations and throughput.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
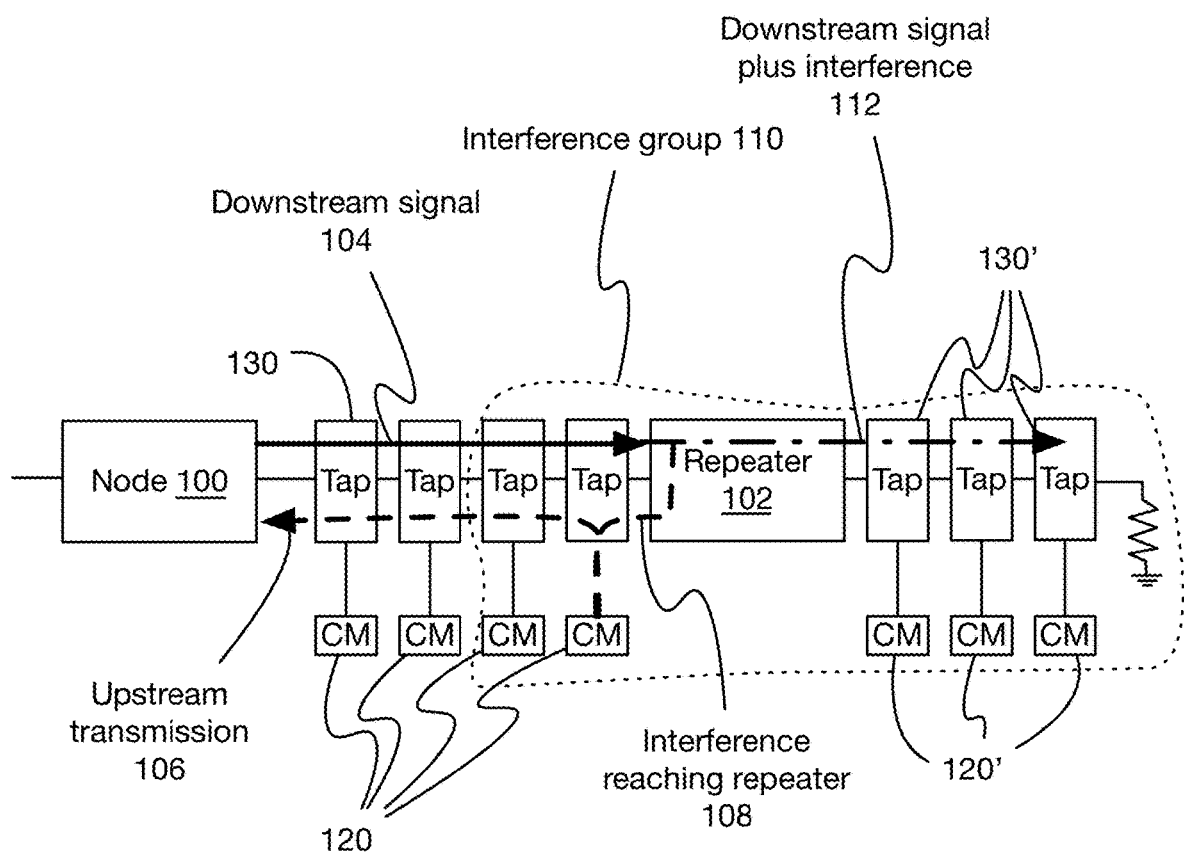
FIG. 1A is a block diagram illustrating an implementation of a broadband transmission system.

The details of various embodiments of the methods and systems are set forth in the accompanying drawings and the description below.

DETAILED DESCRIPTION

The following standard(s), including any draft versions of such standard(s), are hereby incorporated herein by reference in their entirety and are made part of the present disclosure for all purposes. DOCSIS 3.0, DOCSIS 3.1, and DOCSIS 4.0, promulgated by Cable Television Laboratories, Inc. (CableLabs) of Louisville, Colorado. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for north port interference mitigation in an FDX amplifier; and Section B describes a network environment and computing environment which may be useful for practicing embodiments described herein.

A. Systems and Methods for Interference Mitigation

New implementations of broadband communications systems utilize full duplex (FDX) communications with simultaneous upstream and downstream transmissions within the same spectrum. FDX amplifiers may be used in such systems to provide service, such as for retransmissions or rebroadcasts of signals between devices. These amplifiers may be prone to interference from various noise sources, which may impair operations and throughput. In particular, interference from desired upstream transmission signals can reach the FDX amplifier's north port (e.g. upstream) input with significant total power relative to the total power of the desired downstream signal. Interference can come from various sources, including from reflected upstream transmissions; cable modem (CM) transmission leakage due to finite tap-to-output isolation; or other sources. For example, in many implementations of cable taps or other nodes with three or more ports, a signal injected into one port and intended for transmission from a second port may "leak" or be transmitted via a third or other ports at a reduced signal level. This may be due to capacitive or inductive coupling between circuit elements, filters without complete attenuation, etc. Interference power may fluctuate arbitrarily on the upstream channels, depending on CM grants, potentially affecting power amplifier (PA) non-linearity and echo cancellation in the south port of the FDX amplifiers. Interference levels may even be higher in amplitude than the desired downstream signal in many instances. This can cause a substantial difference in total north port input power depending on whether the upstream amplifier is transmitting or not. Absent any mitigation, these power fluctuations may get passed through to the south port (with some phase and/or frequency tilt added in many implementations) resulting in: compression and/or clipping at south port PA due to increased downstream transmission power when upstream is transmitting; increased echo at south port due to increased downstream transmission power, requiring additional back-off at FDX input analog front ends (AFEs) and corresponding loss of echo cancellation (EC) performance.

Accordingly, implementations of the systems and methods discussed herein provide improvements in interference mitigation and cancellation. Interference mitigation or cancellation may comprise partially or completely removing, reducing, attenuating, or otherwise filtering interfering signals, noise, or energy within a communication band, thereby improving signal to noise ratio, signal quality or intelligibility of a desired signal, or otherwise improving communication throughput. In many implementations, an interference canceller in the downstream path may be provided to equalize composite power on the FDX upstream subbands within a predetermined range of amplitude (e.g. X dB) from the desired downstream signal on the same subband, without affecting the downstream subbands.

Referring first to FIG. 1A, illustrated is a block diagram of a broadband transmission system, according to some implementations, including a node 100 (e.g. a fiber node), a first (upstream relative to repeater 102) plurality of taps 130 and client devices (e.g. cable modems) 120, a repeater 102, and a second (downstream relative to repeater 102) plurality of taps 130' and client devices 120'. As shown, a downstream signal 104 may be transmitted by the node and received by repeater 102, and an upstream transmission 106 may be transmitted by a cable modem. Interference from the upstream transmission 108 may reach repeater 102 on its input (north) port, and accordingly, the repeater may transmit or repeat the downstream signal plus interference 112. This may result in impaired performance for the downstream devices and/or upstream devices within the interference group 110.

Specifically, in many instances, CM interference can result from CMs 120, 120' both south to and north to the FDX amplifier or repeater 102. CM signals arriving at the south port are amplified and re-transmitted on the north port. Reflections due to a finite return loss at the north port interferes with the downstream signal. Similarly, CM transmissions from the north side of the amplifier reflected back to its north port through the finite port-to-output loss of the nearest tap to the amplifier. While retransmission interference may potentially be addressed through echo cancellation techniques in the amplifier, echo cancellation cannot address north port leakage-based interference with a north port EC.

Figure 1B:
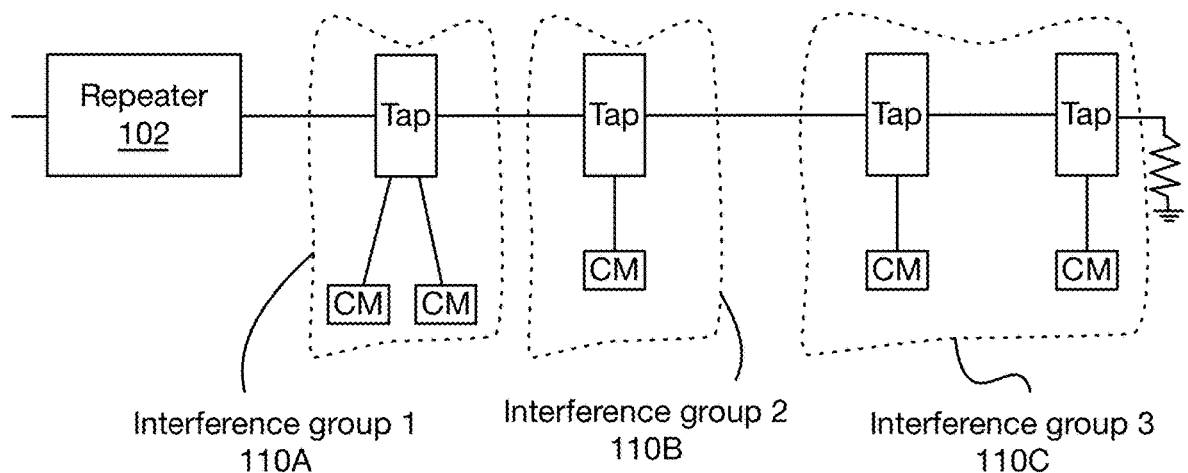
FIG. 1B is a block diagram illustrating an implementation of a broadband transmission system with interference groups.

In many implementations, scheduling resource block assignments (RBAs) amongst interference groups may help mitigate interference, such as reducing or eliminating the impact of upstream distortion on CMs south (e.g. downstream) of the repeater. For example, FIG. 1B is a block diagram illustrating an implementation of a broadband transmission system with interference groups 110A-110C, referred to generally as an interference group 110. Devices in an interference group may utilize the same RBA, and multiple interference groups may be assigned different RBAs to allow for full duplex transmission. An RBA may comprise an identification of subbands to use for upstream or downstream transmissions. For example, in some implementations, an RBA may comprise a 3-bit value indicating to use a subband for either upstream (1) or downstream (0) transmission. Subbands may each comprise a frequency range, which may be predetermined or identified during a configuration or setup, within a larger frequency range for a communication. For example, given a 10 MHz bandwidth for a communication, the range may be divided into 10 equal 1 MHz subbands. Subbands may be equal or unequal in size, in various implementations.

Figure 1C:
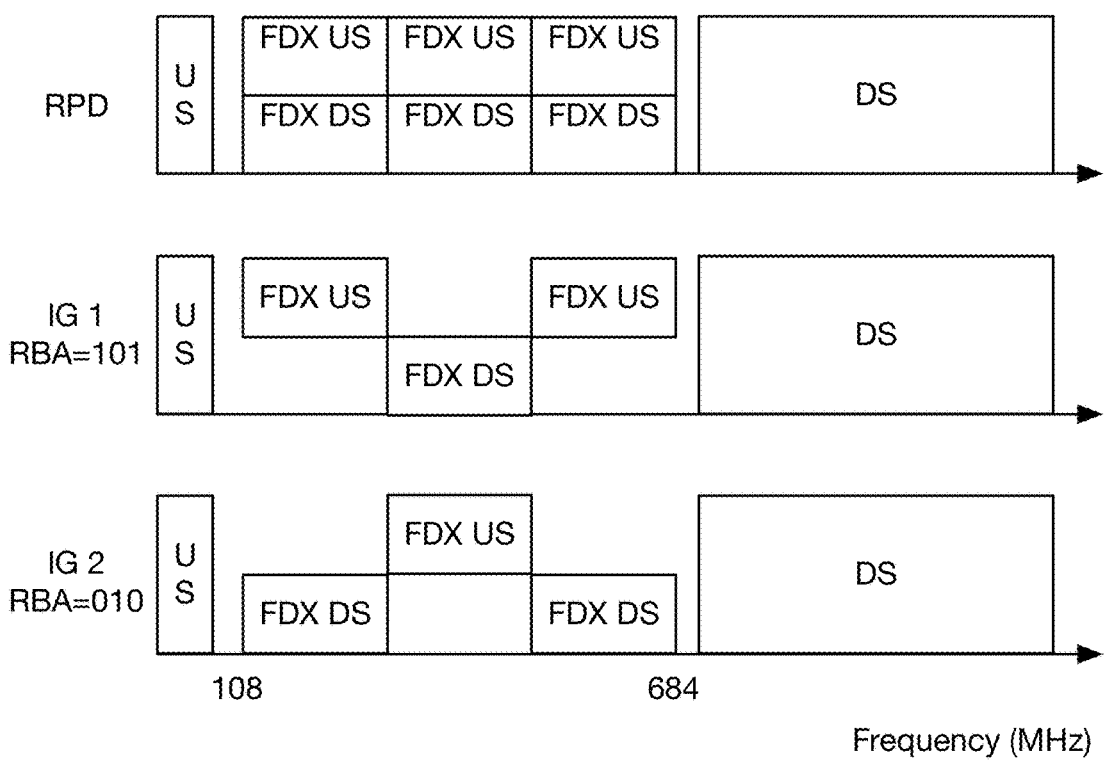
FIG. 1C is an illustration depicting an implementation of resource block assignments (RBAs) for interference groups.

Referring briefly to FIG. 1C, illustrated is an implementation of RBA assignments for interference groups, with a first interference group assigned RBA 101 and a second interference group assigned RBA 010. RBAs may be dynamically reassigned to adjust the balance of downstream vs. upstream transmissions for each interference group to match demand.

Figure 2A:
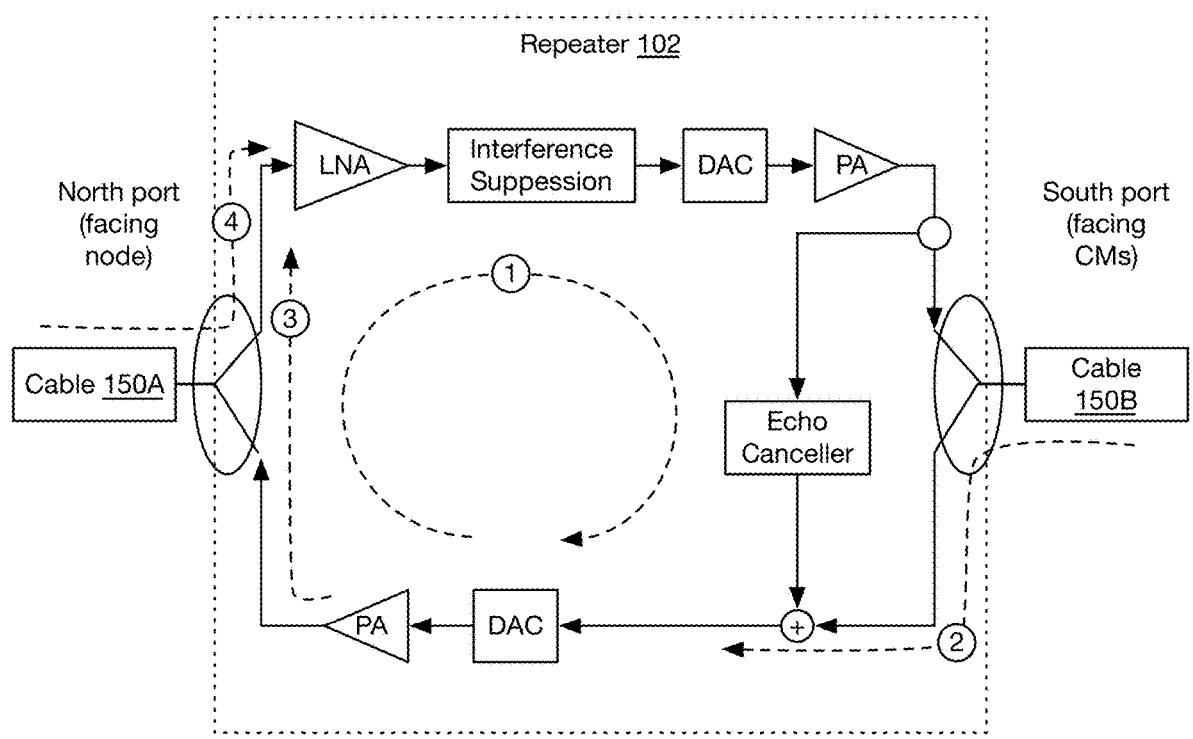
FIG. 2A is a block diagram of an implementation of an FDX repeater or amplifier.

FIG. 2A is a block diagram of an implementation of an FDX repeater or amplifier 102, with a north port to cable 150A (facing a fiber node, for example) and a south port to cable 150B (facing additional CMs, for example). In some implementations, transmissions received from the fiber node (or other northern devices) and intended for retransmission via the south port may be referred to as downstream transmissions; conversely, transmissions received from southern devices and intended for retransmission to northern devices may be referred to as upstream transmissions.

In many implementations, an FDX repeater or amplifier may include echo cancellation connected to its south port as shown. In many implementations, all CMs or other devices south of the FDX repeater or amplifier may be in the same interference group (and assigned the same RBA, in many implementations). Echo cancellation may be used to prevent upstream transmissions from these devices being reflected back downstream. The "clean" upstream signal may be amplified and retransmitted via the north port. In many implementations, no echo cancellation may be needed at the north port or echo cancellation may be irrelevant at the north port since CM transmissions from devices immediately north of the repeater may interfere with all CMs to the south of the repeater. RBA scheduling may be used to avoid this interference.

There are several potential sources of interference within the FDX amplifier or repeater, shown in dashed line in FIG. 2A. For example, due to the gain loop between the north port and south port (1), downstream signals may be reflected and amplified. Reflected downstream signals (2) can also interfere with upstream signals (as well as reflected residual echo interference (3)). At the north port, reflected upstream signals and upstream transmissions from nearby devices north of the repeater may interfere with incoming downstream signals (4). These various interference sources may be referred to variously as self-interference, northern CM or northern device interference, etc.

Figure 2B:
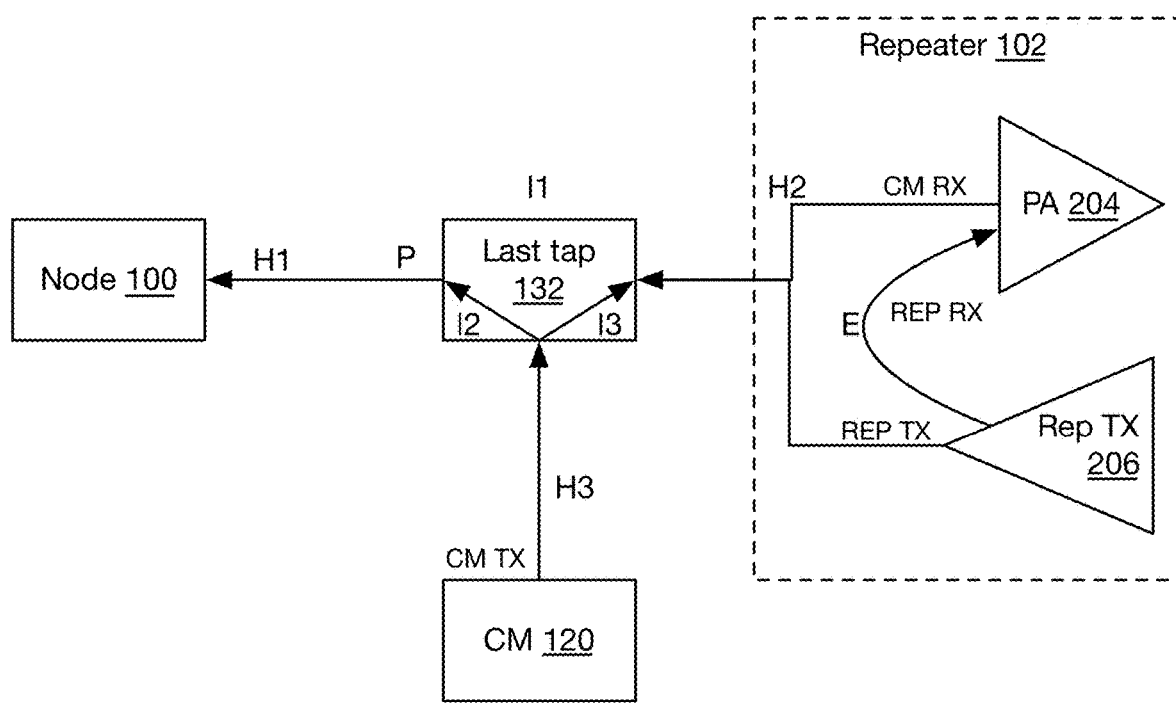
FIG. 2B is an illustration of the sources of CM and self repeater interference, according to some implementations.

FIG. 2B is an illustration of the sources of CM and self repeater interference, according to some implementations. At point P, a signal from the repeater 102 and from a north (upstream) CM are the same since they arrive at the Node 100 with the same power TX_P:

$$TX\_P = CM\_TX + H3 + I2$$

$$TX\_P = REP\_TX + H2 + I1$$

At the repeater 102 input:

$$REP\_RX = TX\_P - H2 - I1 + E$$

$$CM\_RX = TX\_P - I2 + I3 + H2$$

Interference with CM vs. Interference with REP TX:

$$CM\_RX - REP\_RX = -I2 + I3 + 2*H2 + I1 - E$$

With the assumptions based on typical operations, E=−20 dB; H2=0 dB; I1=−1.5 dB; I2=−8 dB; I3=−23 dB:

$$CM\_RX - REP\_RX = 8 - 23 - 1.5 + 20 - 3.5 \text{ dB}$$

North CM interference is 3.5 dB higher than the expected self interference.

To address these issues, in some implementations, interference mitigation may be provided as follows. In the downstream path, the downstream power may be monitored in each sub-band and increases above a predetermined threshold may be identified. If an increase is seen, the power in the sub-band (or affected portion of the sub-band) may be reduced back to below the threshold. This alters the downstream signal south of the amplifier in the affected sub-band (s), but no CMs are listening to this signal: recall that all CMs 120' south of the repeater, plus CMs 120 immediately to the north, are all in one Interference Group 110, so none of these CMs is attempting to receive the downstream signal in the sub-band(s) affected by the added upstream power. In many implementations, all sub-bands may be monitored at all times, so the FDX amp does not require awareness of downstream and upstream subband allocation.

Figure 3A:
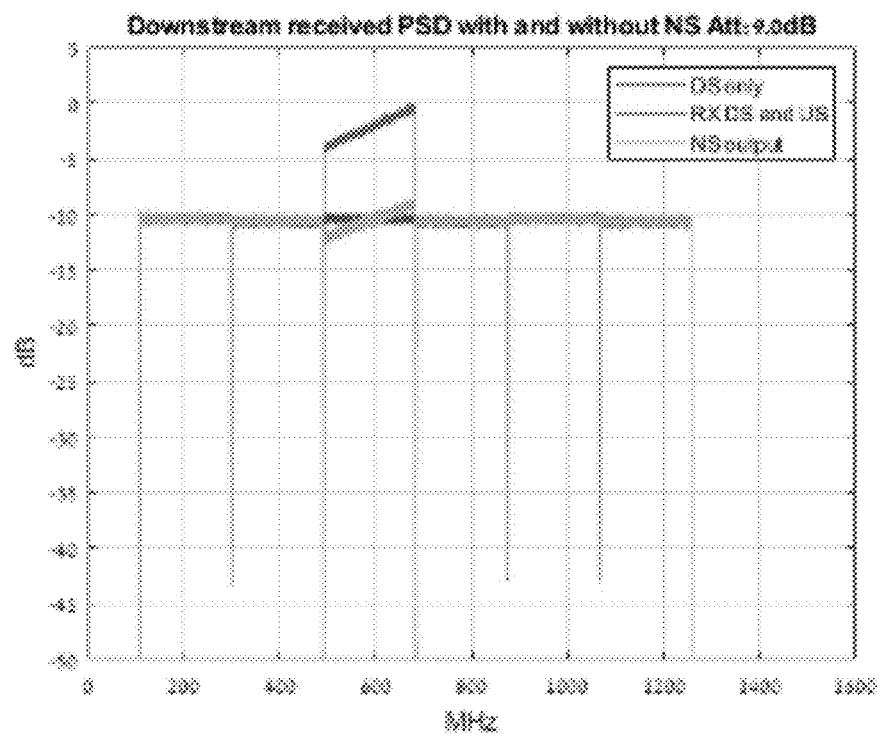
FIGS. 3A-3C are graphs illustrating downstream noise suppression examples, according to some implementations.
Figure 3B:
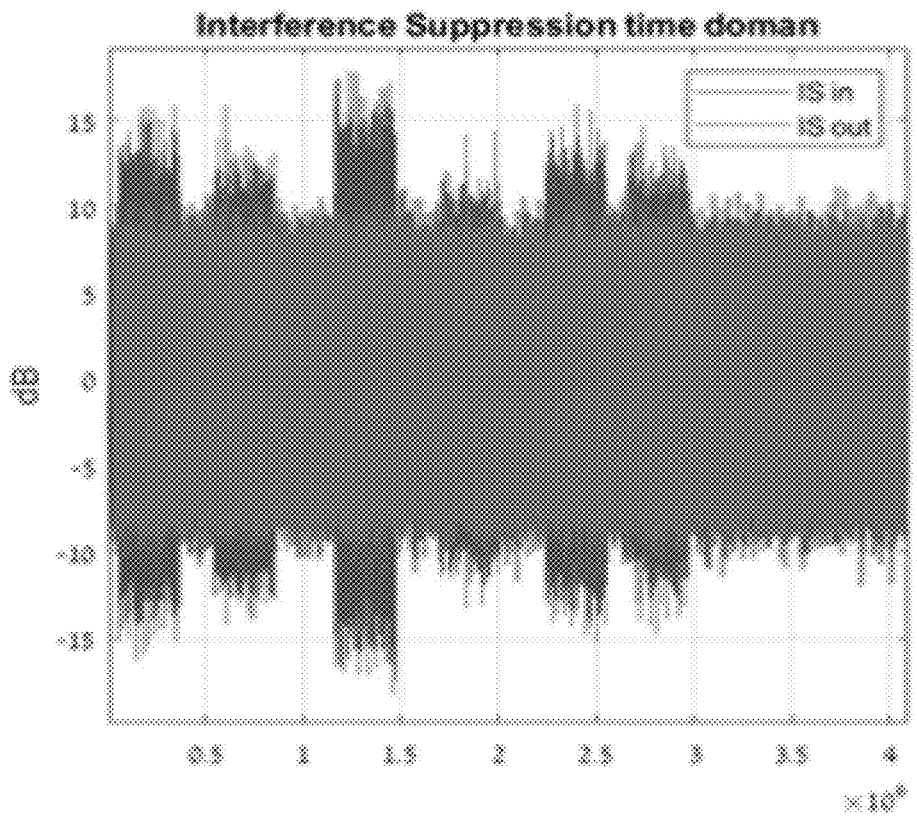
Figure 3C:
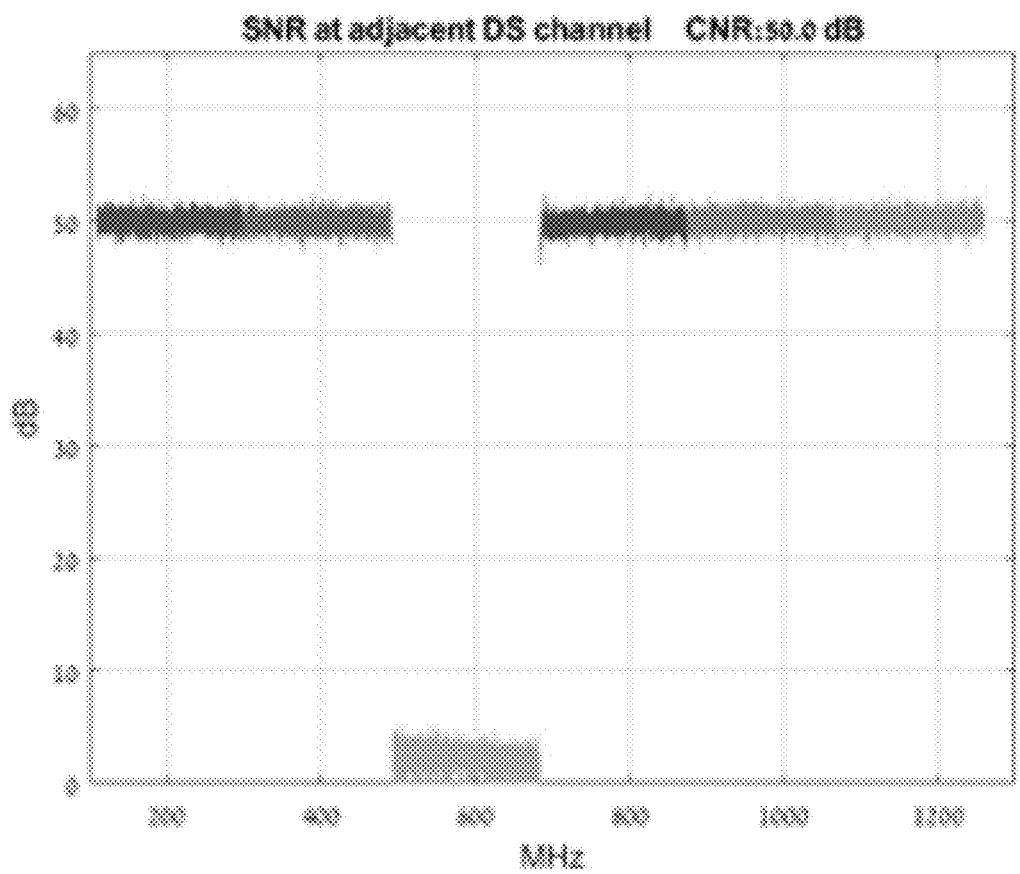

FIGS. 3A-3C are graphs illustrating downstream noise suppression examples, according to some implementations. FIG. 3A illustrates downstream received PSD with and without noise suppression, in some implementations. FIG. 3B illustrates an example input and output signal before and after interference suppression. FIG. 3C illustrates the signal to noise ratios at adjacent downstream channels with noise suppression applied, in some implementations. In the illustrated implementation, the full subband is analyzed, with transmissions tilted upstream on the third band as shown. In many implementations, narrowband interference may not be attenuated or may be attenuated only slightly.

As discussed above, in some instances due to interference, compression or clipping may occur at south port PA due to increased downstream transmission power when upstream is transmitting. Implementations of the systems and methods discussed herein address this by not increasing downstream transmission power beyond the threshold used by the level limiter. Some extra headroom may still be applied at south port PA to avoid clipping, but this may be greatly reduced or eliminated in some implementations. Additionally, increased echo at south port due to increased transmission power, requiring additional backoff at FDX input AFEs and corresponding loss of EC performance is addressed because the variation in echo level is bounded by the threshold of the level limiter. FDX input AFEs may require only enough additional backoff to accommodate this much smaller amount of variation, greatly improving system performance.

In many implementations, the limiter may be provided with some knowledge of the intended downstream level in order to know when the current power level is out of range. The accuracy of this information may determine the threshold of the level limiter, which in turn dictates the performance of the system. For example, if an intended level X is known within 0.1 dB, the threshold can be set at (X+0.2 dB), and only very minor fluctuations will be seen in downstream output level at south port. If the intended level X is known within 3 dB, the threshold may be set at (X+3-ish dB), requiring much more headroom and AFE backoff to accommodate large swings in downstream Tx power. Accordingly, in some implementations, a "level learning" step may be utilized to maximize accuracy, reducing the threshold over time based on system performance. For example, levels may be learned when the FDX amp is first installed; whenever the frequency plan is changed in the FDX band (e.g. change FDX Allocated Spectrum, add or remove significant exclusions, add or remove QAM channels in non-Allocated Spectrum, etc.); at regular intervals, on the order of once per day; or any other such time. The interference mitigation processor may communicate with the converged cable access platform (CCAP) cores or service provider to indicate when the learning period will take place, as learning may require a silent period in the upstream (e.g. no CMs transmitting on any sub-band anywhere within hearing range) for several milliseconds (similar to a long ECTO) or any other suitable period. To further improve performance, the FDX amp may track temperature and make necessary adjustments in its expected level.

Figure 4A:
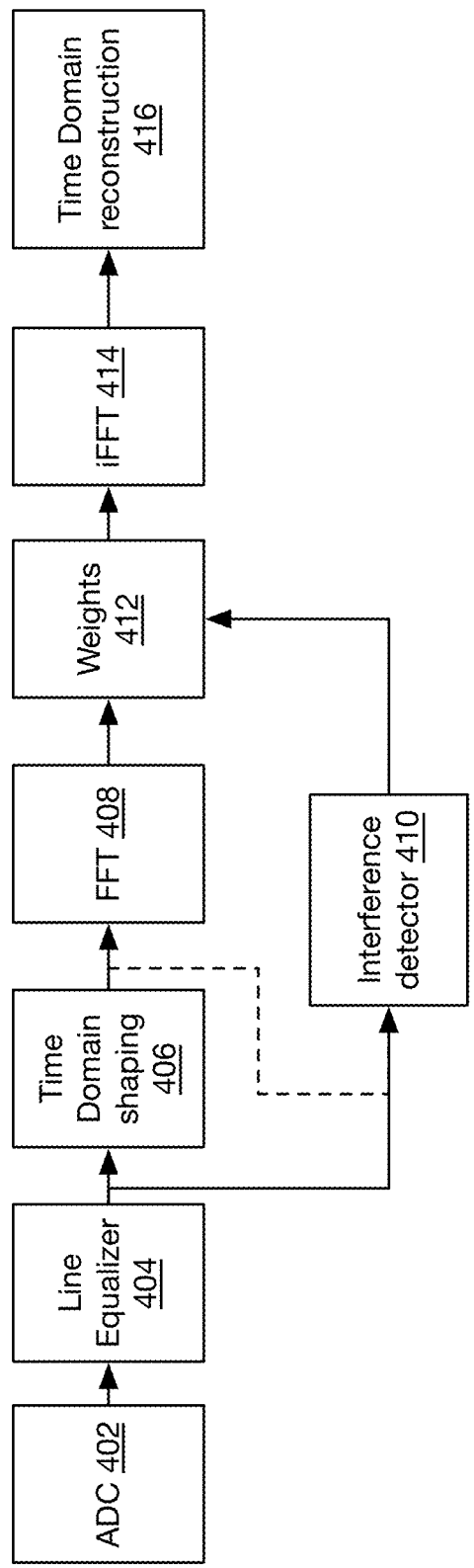
FIG. 4A is a block diagram of an implementation of a downstream interference suppression system.

In many implementations, interference mitigation may be applied in a multi-stage process, including setting a "reference energy" per subband which is equal to the received desired downstream signal energy at the subband; measuring energy at FDX subbands and identifying subband(s) with energy above the reference energy by the allowed threshold of X dB; and implementing subband filters that attenuate the subband energies back to the reference energies. For example, FIG. 4A is a block diagram of an implementation of a downstream interference suppression system. As shown, input signals may be converted to digital via analog to digital converter (ADC) 402 and equalized to flatten the received downstream frequency response via line equalizer 404. After equalization, the signal (and any received interference) may be time domain shaped via shaper 406 to minimize interference with adjacent subbands due to sharp filters in the frequency domain. The signal may be converted to the frequency domain via FFT 408 or other domain converter circuit or subcircuits (e.g. wavelet transformers, discrete Fourier transforms, sparse Fourier transforms, etc.), which may be generally referred to as time-frequency domain converters, time-frequency domain transformers, time-frequency domain converter circuits, or any other similar terms. The frequency domain signal may be used to measure energy on FFT bins belonging to the subbands, and in many implementations, the interference detector 410 (sometimes referred to as a processing subcircuit, processor, or by similar terms) calculates frequency domain filter weights 412 as a function of the measured energies. Similarly, the subband energies can be measured on the signal at the equalizer output. Interference detector or a processing subcircuit 410 may comprise hardware, software, or a combination of hardware and software. For example, in some implementations, interference detector or processing subcircuits may comprise a digital comparator comparing an input digital signal or bitstream to a reference signal or value (e.g. by XORing binary words representing sampled signal amplitudes with a reference signal amplitude or threshold amplitude, etc.). In other implementations, interference detector may comprise an analog comparator with an reference level (e.g. preset voltage level). Other combinations of analog and digital hardware and/or software may be utilized in various implementations to identify attenuation levels or weights or compare input signals to reference signals or values.

Specifically, in many implementations for interference detection, given F (B) as a vector of FFT bins that belong to subband B and R(B) is the pre-calculated reference energy of subband B:

E(B)=sum (F(B)^2) is the measured energy per subband; and

A(B)=E(B)−R(B) is the required attenuation in band B, which is used to calculate the Weights corresponding to subband B.

To set a reference energy level for each subband, in some implementations, a "downstream training sequence" may be utilized during a time period in which no upstream transmissions are occurring (sometimes referred to as "quiet probes"). The downstream training sequence could be any downstream transmission on the FDX band with power per subband as configured by the CCAP and used for regular downstream transmissions, in many implementations. During training the reference energy of a subband is measured in the frequency domain by the interference detector 410, by summing together energies of FFT bins belonging to the subband. The training signal may be received prior to or, in other implementations, after time domain shaping 406. Training may be performed during first installation, during changes in the downstream frequency response as described above and/or regularly during training periods as set by the CCAP. In other implementations the training sequence could be a Pseudo Random sequence with a flat or known PSD.

Subband filter weights are calculated so that the energy at the output of the filter is equal or close enough to R(B). The weights may be used with any window type including Brickwall, Raised Cosine, Kaiser, etc., to minimize out of band interference with adjacent downstream subbands in various implementations.

Frequency domain filtering may be performed on the frequency domain converted signal by multiplying the signal by the filter weights for each subband by a filter circuit or subcircuit and reconverting to the time domain via IFFT 414 (or other time-frequency domain converter circuit or subcircuits) as discussed above. In various implementations, a filter circuit or subcircuit may comprise software, hardware, or a combination of hardware and software. For example, in some implementations, a filter circuit or subcircuit may comprise instructions to a processor to multiply input digital signal samples in a frequency domain by weights. In some implementations, a filter circuit or subcircuit may comprise passive or active electronic filters (e.g. bandpass or notch filters, variable bandwidth filters, etc.). Various combinations of analog and/or digital filters may be utilized in different implementations. A final time domain reconstruction block 416 may apply shaping and reshaping in the time domain in many implementations to minimize interference with adjacent subbands as described above.

In many implementations, the processing and filter subcircuits discussed above may be separate subcircuits. In other implementations, the processing and filter subcircuits may be part of the same circuit or subcircuit. In many implementations, one or more components may be common or shared between the processing and filter subcircuits (e.g. common or shared signal buffers or memory elements, common or shared signal busses, common or shared power supply circuits or subcircuits or elements, etc.).

Figure 4B:
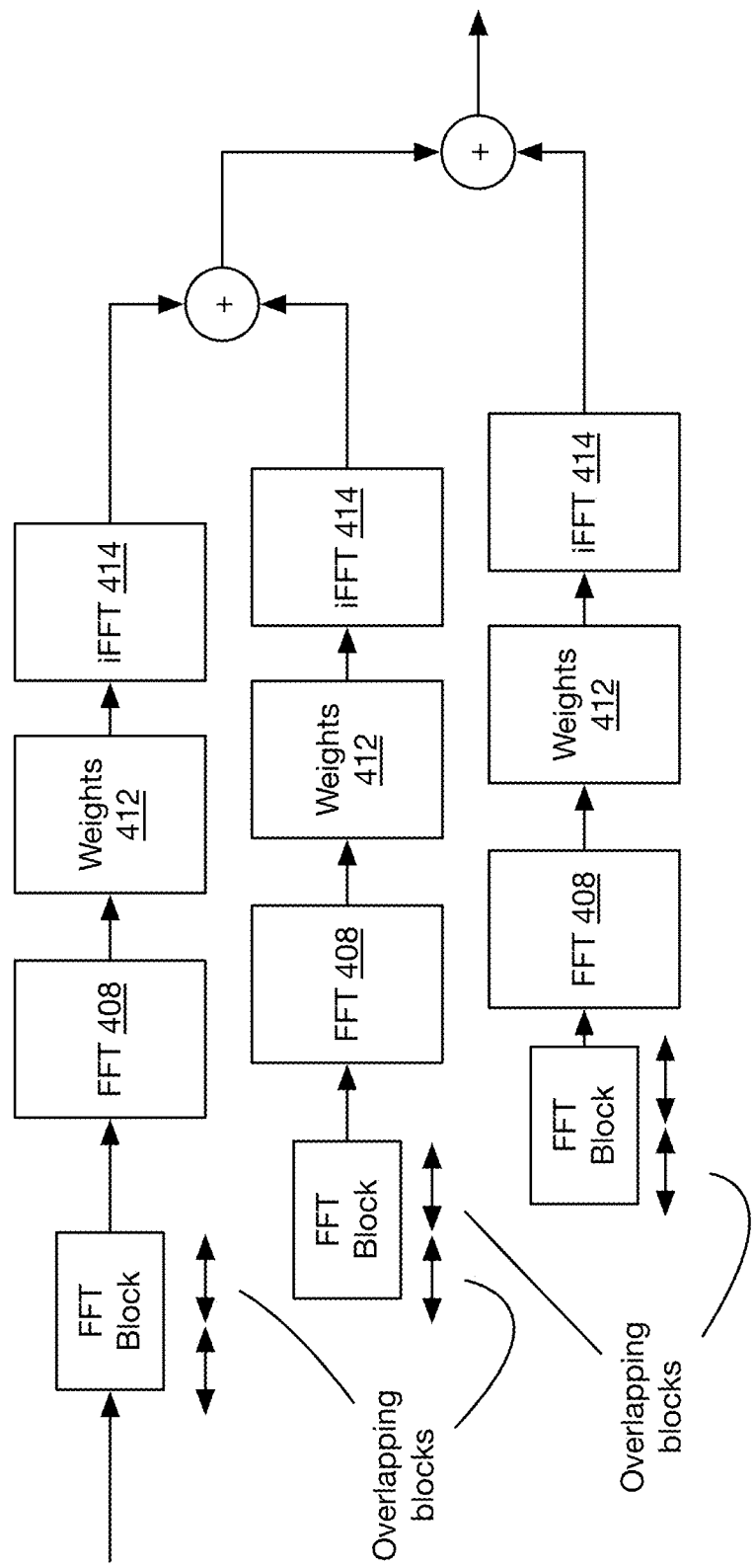
FIG. 4B is a block diagram of an example implementation of processing during downstream interference suppression.

FIG. 4B illustrates an example implementation of processing during downstream interference suppression and particularly an implementation of steps 408-414 and 416. As shown, a sliding and overlapping window may be utilized for signal processing by interference suppressor circuitry in FFT 408, weighting 412, and iFFT 414, with each processed signal summed with the prior (and overlapping in time) signal.

Figure 4C:
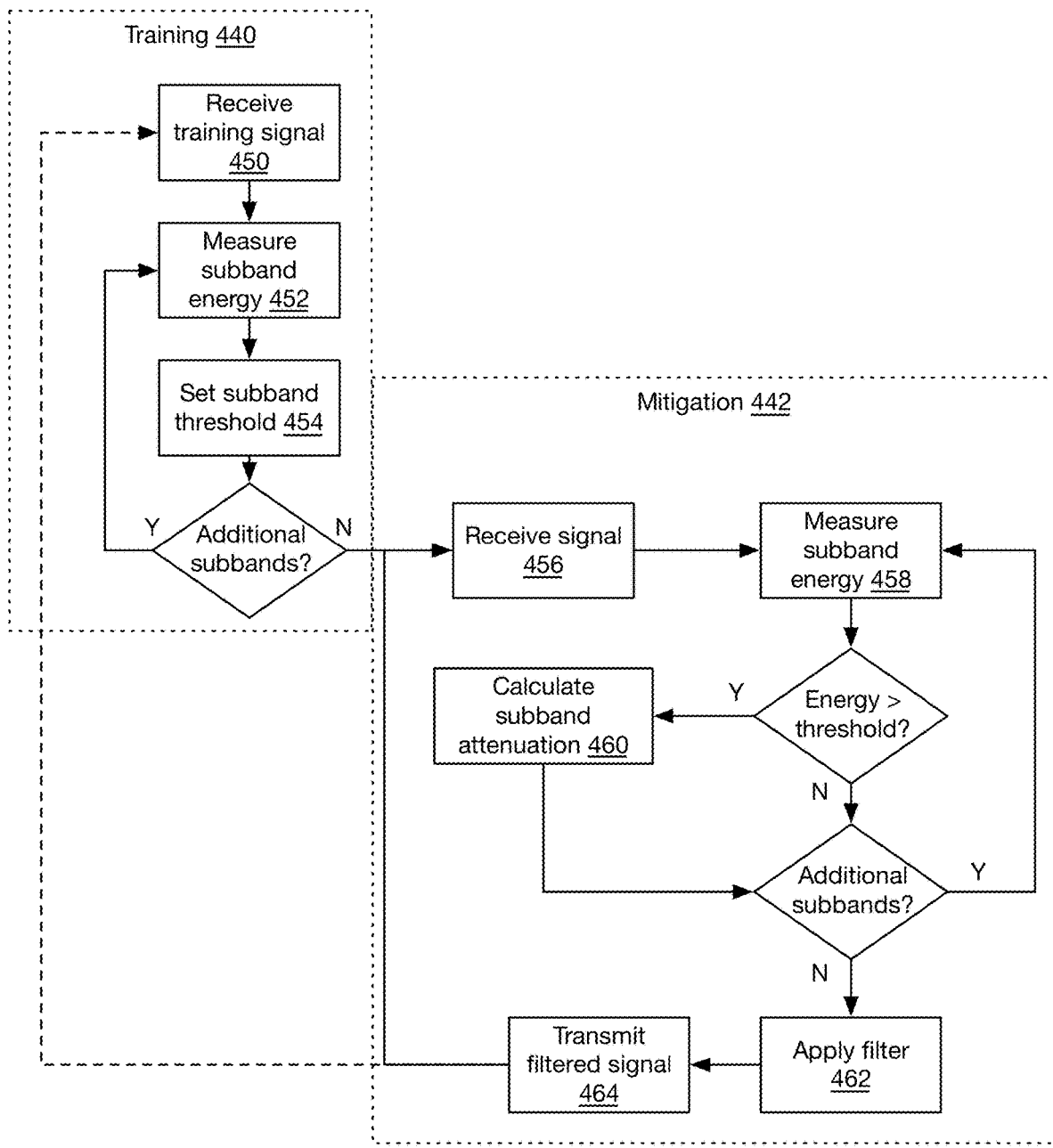
FIG. 4C is a flow chart of a method of interference detection and mitigation, according to some implementations.

FIG. 4C is a flow chart of a method of interference detection and mitigation, according to some implementations. The implementation shown includes a first training portion 440 and a second mitigation portion 442, which may be referred to as a processing or filtering portion. First training portion 440 may be executed on startup or initialization, periodically (e.g. daily, hourly, etc.), dynamically (e.g. whenever a signal may be used for training, such as when interfering devices are not transmitting), manually, whenever the frequency plan is changed (e.g. when spectrum allocations are changed, when exclusions are added or removed, when QAM channels in a non-allocated spectrum are added or removed, etc.), or with any other such trigger.

At step 450, a device or processing circuit, such as a repeater 102 or other such device, may receive a training or reference signal. In some implementations, the training or reference signal may be a predetermined signal used only for training. In other implementations, the training or reference signal may be a standard data signal that is transmitted continuously by the CCAP, and training is scheduled or triggered at a time when no other devices are transmitting on any sub-band within range of the device or processing circuit (e.g. devices within a certain number of taps or in an interference group such that their transmissions may cause detectable interference). Devices beyond the interference group that may not cause sufficient interference may not be affected in many implementations and may transmit normally. Accordingly, in many such implementations, the training or reference signal may be pre-scheduled by a controller or administrative entity or device. The training or reference signal may be several milliseconds in length, tens or hundreds of milliseconds, or any other such interval. In some implementations, other measurements may be taken during the training period (e.g. temperature, etc.).

At step 452, the device or circuit may measure an amount of energy in a frequency subband. In some implementations, measuring the amount of energy may comprise converting the signal via an FFT or other domain converter subcircuit to a frequency domain signal and measuring an amount of energy in each one or more frequency bins within the subband. At step 454, a threshold may be set for the subband equal to the amount of energy in the subband and/or the energy value may be recorded, and steps 452-454 may be repeated for each additional frequency subband. For example, as described above in connection with FIG. 4A, the received signal may be converted to digital via an ADC, equalized and time-domain shaped, and converted to a frequency domain representation. The energy in the subbands may be measured and, in some implementations, the signal may be converted back to a time domain (e.g. via an IFFT), shaped, and retransmitted (not illustrated). Although shown as an iterative process, in many implementations, steps 452 and 454 may be performed in parallel, or may be performed collectively in series (e.g. measuring energy for all subbands and then setting thresholds for all subbands).

Once trained, in a mitigation portion 442, at step 456, the device may receive a signal. The signal may be received at a north or downstream input or upstream output port, e.g. reflected from a tap north of the FDX amplifier or other device, and the signal may include interference from one or more additional devices such as cable modems south and north of the FDX amplifier. The interference may comprise interference from upstream retransmissions of downstream devices by the device, and/or may comprise interference from downstream leakage from upstream transmissions of upstream devices.

At step 458, the device may measure energy of the signal in a frequency subband, which could be an FDX Subband, or any other configurable frequency band. Measuring the energy may comprise converting the signal to a frequency domain via an FFT or similar subcircuit. In some implementations, additional processing such as equalization and time-domain shaping may be applied prior to conversion. The measured energy may be compared to a threshold (e.g. the energy value for the training or reference signal in the corresponding subband), or a difference between the measured energy of the signal and the energy of the training or reference signal in the subband may be determined. If the difference is non-zero or positive, or if the measured energy exceeds the threshold, then at step 460, an attenuation amount may be determined for the subband, or an amount (e.g. in decibels, voltage, or any other applicable measurement) by which energy or a signal in the subband should be reduced (e.g. via a filter, reduced gain on a subband amplifier, voltage divider, or any other type and form of attenuating circuit). As discussed above, the attenuation amount may be proportional to the difference in energy between the signal and the training or reference signal in the subband. If the energy does not exceed the threshold (or if the difference is negative), then no attenuation may be applied in the subband in some implementations. For example, if a training signal intended to be flat has a first level in a first subband and a second level 6 dB higher in a second subband, then the system may identify an attenuation of −6 dB to be applied to the second subband. The attenuation amount may be stored, in some implementations, as part of a filter weight vector. Steps 458-460 may be repeated for each additional subband (and may be performed in parallel for different subbands or in sequence for all subbands, as discussed above).

At step 462, the signal may be filtered in the frequency domain in some implementations. Filtering the signal may comprise attenuating each subband according to the determined filter weights. For example, in one implementation, the energy value in each subband exceeding the threshold may be multiplied by a corresponding filter weight, such that the resulting energy value is equal to the energy of the reference signal for that subband. At step 464, the filtered signal may be retransmitted via a south port or downstream from the device. Retransmitting the signal may comprise converting the signal from a frequency domain to a time domain (e.g. via an IFFT subcircuit), applying time domain shaping, converting the signal to analog via a DAC, etc.

Steps 456-464 may be repeated for additional received signals, and in some implementations, steps 450-454 may be repeated for additional training periods as discussed above.

With some implementations of the method discussed above, the FDX amplifier does not need to be aware of the current RBA as set by the CCAP or scheduler, or which of the FDX Subbands are upstream subbands and which are downstream subbands. Such implementations can be applied when the RBA is not known at the FDX amplifiers, but can also be applied when the RBA is known. In other implementations, when RBA is known, an FDX Subband that is known to be an upstream subband can be completely blocked, and replaced by a downstream signal locally generated by a downstream modulator.

Accordingly, implementations of the systems and methods discussed herein provide improvements in interference mitigation and cancellation. In many implementations, an interference canceller in the downstream path may be provided to equalize composite power on the FDX upstream subbands within a predetermined range of amplitude (e.g. X dB) from the desired downstream signal on the same subband, without affecting the downstream subbands.

In one aspect, the present disclosure is directed to a method for interference mitigation. The method includes receiving, by a device, an input signal comprising data for retransmission and interference from one or more additional devices. The method also includes modifying the input signal by applying, by the device to each of one or more frequency subbands, attenuation to the input signal, the attenuation based on a comparison of an amount of energy of the input signal to an amount of energy of a reference signal for the corresponding frequency subband. The method also includes retransmitting, by the device, the modified input signal.

In some implementations, the one or more additional devices comprise one or more downstream devices, and the interference comprises interference from upstream retransmissions, by the device, of data from the one or more downstream devices. In some implementations, the one or more additional devices comprise one or more upstream devices, and the interference comprises downstream leakage from upstream transmissions of the one or more upstream devices. The additional devices may include CMs, fiber nodes, additional repeaters or amplifiers, CCAP devices, or any other type and form of device.

In some implementations, the method includes converting the input signal from a time domain to a frequency domain, multiplying each subband of the frequency domain signal by a subband weight, and converting the input signal from the frequency domain to the time domain. In a further implementation, the method includes calculating a subband weight for each of the one or more frequency subbands proportional to a difference between the amount of energy of the input signal and the amount of energy of the reference signal for the corresponding frequency subband.

In some implementations, applying attenuation to the input signal is performed responsive to the amount of energy of the input signal for one or more frequency subbands exceeding a corresponding subband energy threshold. In a further implementation, the method includes determining, by the device, each subband energy threshold for the one or more frequency subbands based on the reference signal.

In some implementations, the method includes receiving, by the device, the reference signal; and measuring, by the device, the amount of energy of the reference signal for each of the one or more frequency subbands. In a further implementation, the method includes receiving the reference signal during a period in which the one or more additional devices are not transmitting.

In some implementations, the device comprises a full duplex amplifier, and the one or more additional devices comprise cable modems.

In another aspect, the present disclosure is directed to a circuit for interference mitigation. The circuit includes an input configured to receive an input signal comprising data for retransmission and interference from one or more additional devices; a processing subcircuit configured to determine an amount of attenuation to apply to each of one or more frequency subbands of the input signal, the attenuation based on a comparison of an amount of energy of the input signal to an amount of energy of a reference signal for the corresponding frequency subband; a filter subcircuit configured to apply the determined amount of attenuation to each of the one or more frequency subbands; and an output configured to retransmit the attenuated input signal.

In some implementations, the one or more additional devices comprise one or more downstream devices, and the interference comprises interference from upstream retransmissions of data from the one or more downstream devices. In some implementations, the one or more additional devices comprise one or more upstream devices, and the interference comprises downstream leakage from upstream transmissions of the one or more upstream devices.

In some implementations, the input is coupled to a time-frequency domain converter and wherein the processing subcircuit receives the input signal in the frequency domain. In a further implementation, the filter subcircuit is configured to multiply each subband of the frequency domain signal by a subband weight. In a still further implementation, the processing subcircuit is configured to calculate a subband weight for each of the one or more frequency subbands proportional to a difference between the amount of energy of the input signal and the amount of energy of the reference signal for the corresponding frequency subband. In another further implementation, the filter subcircuit is coupled to a frequency-time domain converter or FFT.

In some implementations, the filter subcircuit is configured to apply attenuation responsive to the amount of energy of the input signal for one or more frequency subbands exceeding a corresponding subband energy threshold determined based on the reference signal.

In some implementations, the processing subcircuit is further configured to receive the reference signal, and measure the amount of energy of the reference signal for each of the one or more frequency subbands. In a further implementation, the processing subcircuit is further configured to receive the reference signal during a period in which the one or more additional devices are not transmitting.

B. Computing and Network Environment

Figure 5A:
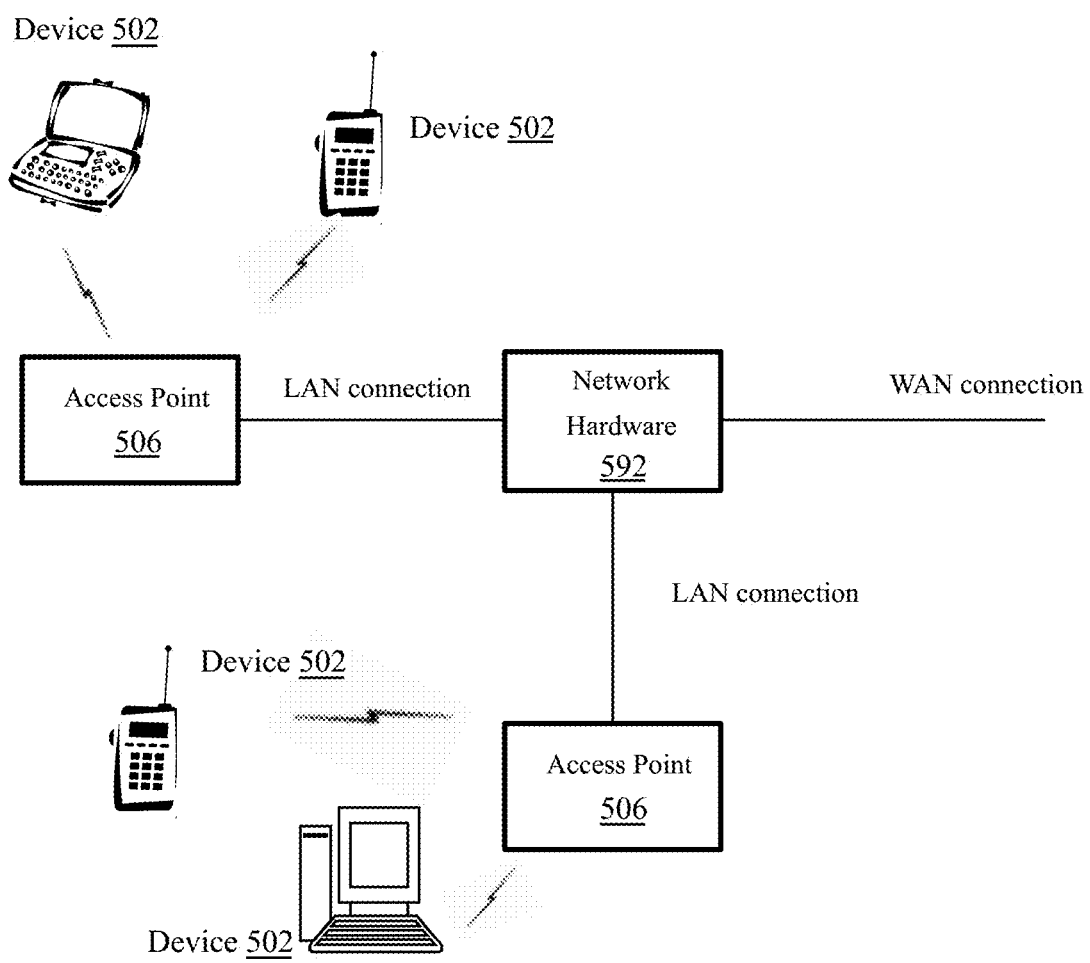
FIG. 5A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 5A, an embodiment of a network environment is depicted. In brief overview, the network environment includes a wireless communication system that includes one or more access points 506, one or more wireless communication devices 502 and a network hardware component 592. The wireless communication devices 502 may for example include laptop computers 502, tablets 502, personal computers 502 and/or cellular telephone devices 502. The details of an embodiment of each wireless communication device and/or access point are described in greater detail with reference to FIGS. 5B and 5C. The network environment can be an ad hoc network environment, an infrastructure wireless network environment, a subnet environment, etc. in one embodiment.

The access points (APs) 506 may be operably coupled to the network hardware 592 via local area network connections. The network hardware 592, which may include a router, gateway, switch, bridge, modem, system controller, appliance, etc., may provide a local area network connection for the communication system. Each of the access points 506 may have an associated antenna or an antenna array to communicate with the wireless communication devices 502 in its area. The wireless communication devices 502 may register with a particular access point 506 to receive services from the communication system (e.g., via a SU-MIMO or MU-MIMO configuration). For direct connections (e.g., point-to-point communications), some wireless communication devices 502 may communicate directly via an allocated channel and communications protocol. Some of the wireless communication devices 502 may be mobile or relatively static with respect to the access point 506.

In some embodiments an access point 506 includes a device or module (including a combination of hardware and software) that allows wireless communication devices 502 to connect to a wired network using Wi-Fi, or other standards. An access point 506 may sometimes be referred to as an wireless access point (WAP). An access point 506 may be configured, designed and/or built for operating in a wireless local area network (WLAN). An access point 506 may connect to a router (e.g., via a wired network) as a standalone device in some embodiments. In other embodiments, an access point can be a component of a router. An access point 506 can provide multiple devices 502 access to a network. An access point 506 may, for example, connect to a wired Ethernet connection and provide wireless connections using radio frequency links for other devices 502 to utilize that wired connection. An access point 506 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 506 may be used for (e.g., in-home or in-building) wireless networks (e.g., IEEE 802.11, Bluetooth, ZigBee, any other type of radio frequency based network protocol and/or variations thereof). Each of the wireless communication devices 502 may include a built-in radio and/or is coupled to a radio. Such wireless communication devices 502 and/or access points 506 may operate in accordance with the various aspects of the disclosure as presented herein to enhance performance, reduce costs and/or size, and/or enhance broadband applications. Each wireless communication devices 502 may have the capacity to function as a client node seeking access to resources (e.g., data, and connection to networked nodes such as servers) via one or more access points 506.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 5B:
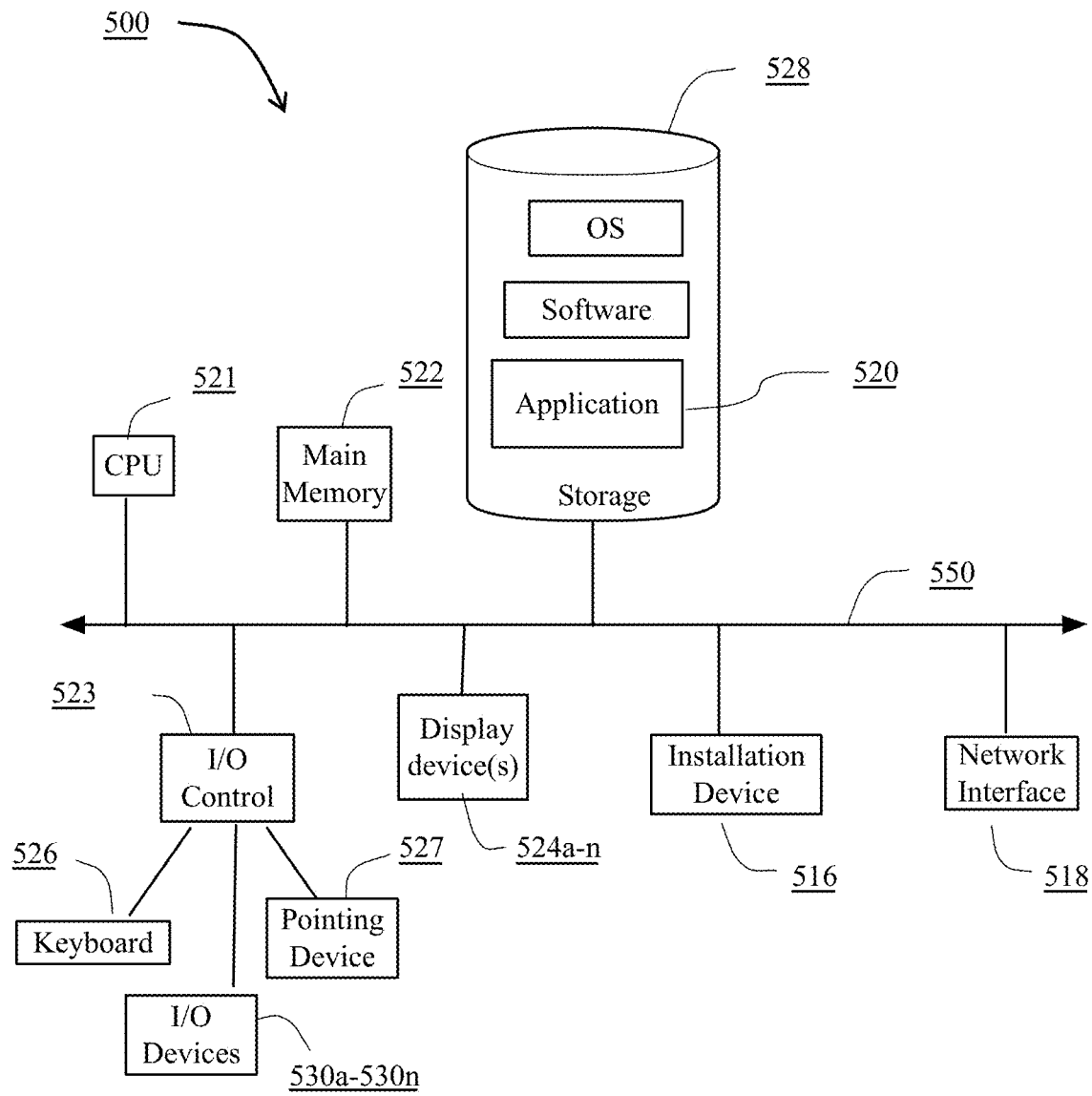
FIGS. 5B and 5C are block diagrams depicting embodiments of computing devices useful in connection with the methods and systems described herein.
Figure 5C:
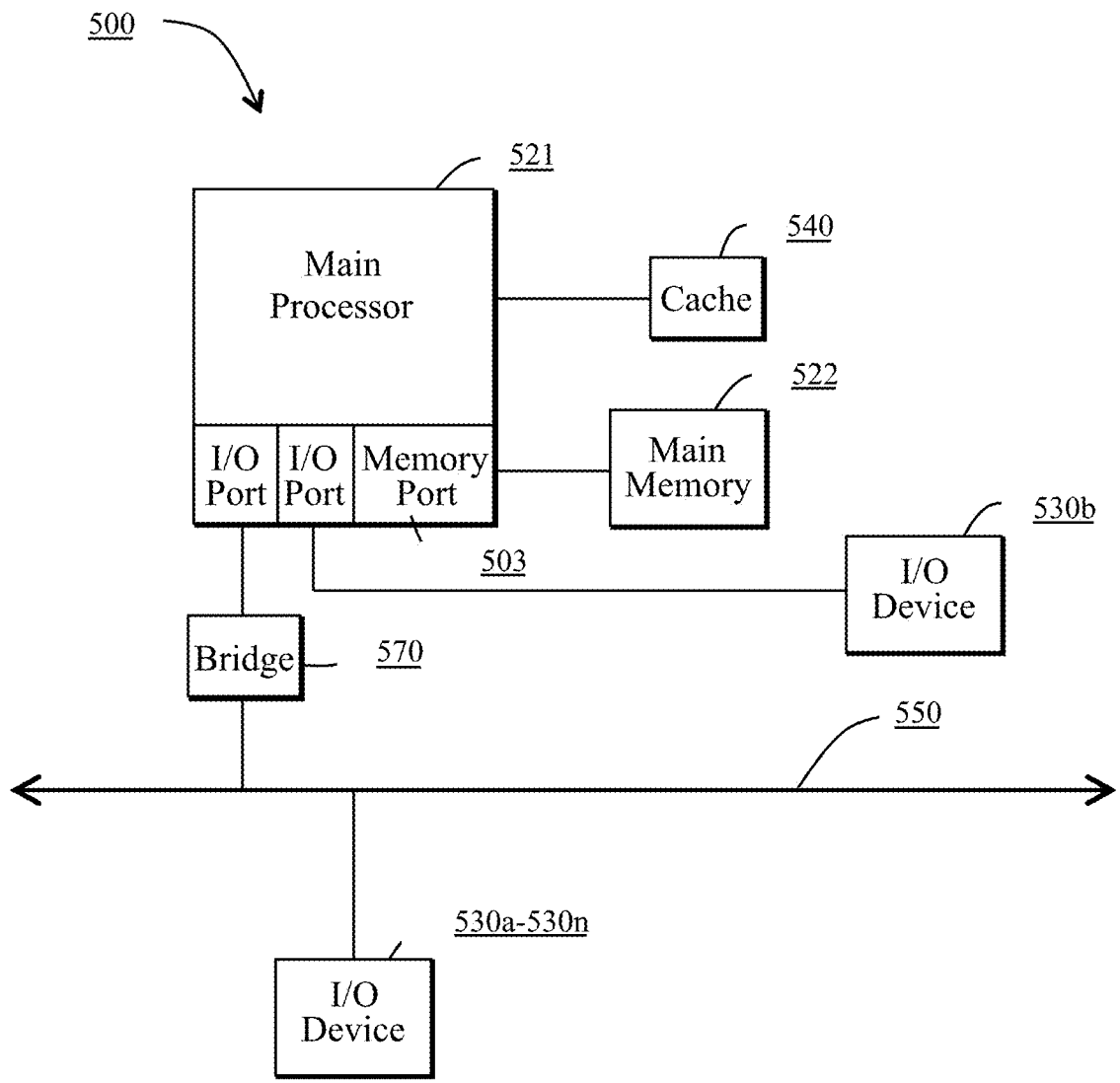

The communications device(s) 502 and access point(s) 506 may be deployed as and/or executed on any type and form of computing device, such as a computer, network device or appliance capable of communicating on any type and form of network and performing the operations described herein. FIGS. 5B and 5C depict block diagrams of a computing device 500 useful for practicing an embodiment of the wireless communication devices 502 or the access point 506. As shown in FIGS. 5B and 5C, each computing device 500 includes a central processing unit 521, and a main memory unit 522. As shown in FIG. 5B, a computing device 500 may include a storage device 528, an installation device 516, a network interface 518, an I/O controller 523, display devices 524a-524n, a keyboard 526 and a pointing device 527, such as a mouse. The storage device 528 may include, without limitation, an operating system and/or software. As shown in FIG. 5C, each computing device 500 may also include additional optional elements, such as a memory port 503, a bridge 570, one or more input/output devices 530a-530n (generally referred to using reference numeral 530), and a cache memory 540 in communication with the central processing unit 521.

The central processing unit 521 is any logic circuitry that responds to and processes instructions fetched from the main memory unit 522. In many embodiments, the central processing unit 521 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 500 may be based on any of these processors, or any other processor capable of operating as described herein.

Main memory unit 522 may be one or more memory chips capable of storing data and allowing any storage location to be directly accessed by the microprocessor 521, such as any type or variant of Static random access memory (SRAM), Dynamic random access memory (DRAM), Ferroelectric RAM (FRAM), NAND Flash, NOR Flash and Solid State Drives (SSD). The main memory 522 may be based on any of the above described memory chips, or any other available memory chips capable of operating as described herein. In the embodiment shown in FIG. 5B, the processor 521 communicates with main memory 522 via a system bus 550 (described in more detail below). FIG. 5C depicts an embodiment of a computing device 500 in which the processor communicates directly with main memory 522 via a memory port 503. For example, in FIG. 5C the main memory 522 may be DRDRAM.

FIG. 5C depicts an embodiment in which the main processor 521 communicates directly with cache memory 540 via a secondary bus, sometimes referred to as a backside bus. In other embodiments, the main processor 521 communicates with cache memory 540 using the system bus 550. Cache memory 540 typically has a faster response time than main memory 522 and is provided by, for example, SRAM, BSRAM, or EDRAM. In the embodiment shown in FIG. 5C, the processor 521 communicates with various I/O devices 530 via a local system bus 550. Various buses may be used to connect the central processing unit 521 to any of the I/O devices 530, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the processor 521 may use an Advanced Graphics Port (AGP) to communicate with the display 524. FIG. 5C depicts an embodiment of a computer 500 in which the main processor 521 may communicate directly with I/O device 530b, for example via HYPERTRANSPORT, RAPIDIO, or INFINIBAND communications technology. FIG. 5C also depicts an embodiment in which local busses and direct communication are mixed: the processor 521 communicates with I/O device 530a using a local interconnect bus while communicating with I/O device 530b directly.

A wide variety of I/O devices 530a-530n may be present in the computing device 500. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 523 as shown in FIG. 5B. The I/O controller may control one or more I/O devices such as a keyboard 526 and a pointing device 527, e.g., a mouse or optical pen. Furthermore, an I/O device may also provide storage and/or an installation medium 516 for the computing device 500. In still other embodiments, the computing device 500 may provide USB connections (not shown) to receive handheld USB storage devices such as the USB Flash Drive line of devices manufactured by Twintech Industry, Inc. of Los Alamitos, California.

Referring again to FIG. 5B, the computing device 500 may support any suitable installation device 516, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 500 may further include a storage device, such as one or more hard disk drives or redundant arrays of independent disks, for storing an operating system and other related software, and for storing application software programs such as any program or software 520 for implementing (e.g., configured and/or designed for) the systems and methods described herein. Optionally, any of the installation devices 516 could also be used as the storage device. Additionally, the operating system and the software can be run from a bootable medium.

Furthermore, the computing device 500 may include a network interface 518 to interface to the network 504 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

In some embodiments, the computing device 500 may include or be connected to one or more display devices 524a-524n. As such, any of the I/O devices 530a-530n and/or the I/O controller 523 may include any type and/or form of suitable hardware, software, or combination of hardware and software to support, enable or provide for the connection and use of the display device(s) 524a-524n by the computing device 500. For example, the computing device 500 may include any type and/or form of video adapter, video card, driver, and/or library to interface, communicate, connect or otherwise use the display device(s) 524a-524n. In one embodiment, a video adapter may include multiple connectors to interface to the display device(s) 524a-524n. In other embodiments, the computing device 500 may include multiple video adapters, with each video adapter connected to the display device(s) 524a-524n. In some embodiments, any portion of the operating system of the computing device 500 may be configured for using multiple displays 524a-524n. One ordinarily skilled in the art will recognize and appreciate the various ways and embodiments that a computing device 500 may be configured to have one or more display devices 524a-524n.

In further embodiments, an I/O device 530 may be a bridge between the system bus 550 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 500 of the sort depicted in FIGS. 5B and 5C may operate under the control of an operating system, which control scheduling of tasks and access to system resources. The computing device 500 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 500 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 500 has sufficient processor power and memory capacity to perform the operations described herein.

In some embodiments, the computing device 500 may have different processors, operating systems, and input devices consistent with the device. For example, in one embodiment, the computing device 500 is a smart phone, mobile device, tablet or personal digital assistant. In still other embodiments, the computing device 500 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed:

1. A circuit, comprising:
   an input configured to receive an input signal comprising data for retransmission and interference from one or more additional devices;
   a first subcircuit configured to determine an amount of attenuation to apply to each of one or more frequency subbands of the input signal, the frequency subbands being FDX subbands, the amount of attenuation being based on a comparison of an amount of energy of the input signal to a threshold, the threshold being determined from an amount of energy of a reference signal for the corresponding frequency subband, the threshold representing a desired amount of energy for the input signal at the corresponding frequency subband;
   a second subcircuit configured to apply the determined amount of attenuation to each of the one or more frequency subbands; and
   an output configured to retransmit the input signal as an attenuated input signal.

2. The circuit of claim 1, wherein the one or more additional devices comprise one or more downstream devices, and wherein the interference comprises interference from upstream retransmissions of data from the one or more downstream devices, and wherein the reference signal is provided during a period in which the one or more additional devices are not transmitting, wherein the input signal is a downstream signal.

3. The circuit of claim 1, wherein the one or more additional devices comprise one or more upstream devices, and wherein the interference comprises leakage from upstream transmissions of the one or more upstream devices into a downstream signal, and wherein the reference signal is provided during a period in which the one or more additional devices are not transmitting, wherein the input signal is the downstream signal.

4. The circuit of claim 1, further comprising a third subcircuit between the input and the first subcircuit and configured to convert the input signal from a time domain into a frequency domain signal.

5. The circuit of claim 1, wherein the second subcircuit is configured to apply attenuation responsive to the amount of energy of the input signal for one or more frequency subbands exceeding a corresponding subband energy threshold determined based on the reference signal.

6. The circuit of claim 1, wherein the first subcircuit is further configured to receive the reference signal, and measure the amount of energy of the reference signal for each of the one or more frequency subbands.

7. The circuit of claim 4, wherein the second subcircuit is configured to multiply each subband of the frequency domain signal by a weight.

8. The circuit of claim 4, further comprising a fourth subcircuit between the second subcircuit and the output and configured to convert the frequency domain signal to the time domain.

9. The circuit of claim 7, wherein the first subcircuit is configured to calculate the weight for each of the one or more frequency subbands proportional to a difference between the amount of energy of the input signal and the amount of energy of the reference signal for the corresponding frequency subband.

10. The circuit of claim 6, wherein the first subcircuit is further configured to receive the reference signal during a period in which the one or more additional devices are not transmitting.

11. A circuit, comprising:
a first subcircuit configured to determine an amount of attenuation to apply to each of one or more frequency subbands of an input signal, the frequency subbands being FDX subbands, the input signal comprising data for retransmission and interference, the amount of attenuation being determined in response to an amount of energy of the input signal and a threshold, the threshold being determined from an amount of energy of a reference signal for the corresponding frequency subband, the threshold representing a desired amount of energy for the input signal at the corresponding frequency subband;
a second subcircuit configured to apply the amount of attenuation to each of the one or more frequency subbands; and
an output configured to retransmit an attenuated input signal.

12. The circuit of claim 11, wherein the interference is from one or more additional devices comprising one or more downstream devices, and wherein the interference comprises interference from upstream retransmissions of data from the one or more downstream devices.

13. The circuit of claim 11, further comprising a third subcircuit configured to convert the input signal from a time domain into a frequency domain signal.

14. The circuit of claim 12, wherein the one or more additional devices comprise one or more upstream devices, and wherein the interference comprises leakage from upstream transmissions of the one or more upstream devices into a downstream signal.

15. The circuit of claim 13, wherein the second subcircuit is configured to multiply each subband of the frequency domain signal by a weight.

16. The circuit of claim 13, further comprising a fourth subcircuit between the second subcircuit and the output and configured to convert the frequency domain signal to the time domain.

17. The circuit of claim 15, wherein the first subcircuit is configured to calculate the weight for each of the one or more frequency subbands proportional to a difference between the amount of energy of the input signal and the amount of energy of the reference signal for the corresponding frequency subband.

18. A full duplex amplifier, comprising:
a first subcircuit configured to determine an amount of attenuation to apply to each of one or more frequency subbands of an input signal, the frequency subbands being FDX subbands, the input signal comprising data for retransmission and interference, the amount of attenuation being determined in response to an amount of energy of the input signal and a threshold, the threshold being determined from an amount of energy of a reference signal for the corresponding frequency subband, the amount of attenuation being determined to reduce the interference, the threshold energy representing a desired amount of energy for the input signal at the corresponding frequency subband;
a second subcircuit configured to apply the amount of attenuation to each of the one or more frequency subbands; and
an output configured to retransmit an attenuated input signal.

19. The circuit of claim 11, wherein the interference is from one or more additional devices comprising one or more downstream devices, and wherein the interference comprises interference from upstream retransmissions of data from the one or more downstream devices.

20. The circuit of claim 12, wherein the one or more additional devices comprise one or more upstream devices, and wherein the interference comprises leakage from upstream transmissions of the one or more upstream devices into a downstream signal.

* * * * *